US009124551B2

(12) United States Patent
Lu et al.

(10) Patent No.: US 9,124,551 B2
(45) Date of Patent: Sep. 1, 2015

(54) MULTI-TOUCH MULTI-USER INTERACTIVE CONTROL SYSTEM USING MOBILE DEVICES

(71) Applicants: Hai Yun Lu, Singapore (SG); Kar Leong Tew, Singapore (SG)

(72) Inventors: Hai Yun Lu, Singapore (SG); Kar Leong Tew, Singapore (SG)

(73) Assignee: SAP SE, Walldorf (DE)

( * ) Notice: Subject to any disclaimer, the term of this patent is extended or adjusted under 35 U.S.C. 154(b) by 301 days.

(21) Appl. No.: 13/926,834

(22) Filed: Jun. 25, 2013

(65) Prior Publication Data

US 2014/0380182 A1   Dec. 25, 2014

(51) Int. Cl.
*G06F 13/00*       (2006.01)
*H04L 29/08*       (2006.01)
*G06F 9/44*        (2006.01)
*G06F 3/0488*      (2013.01)

(52) U.S. Cl.
CPC .......... *H04L 67/025* (2013.01); *G06F 3/04883* (2013.01); *G06F 9/44* (2013.01); *G06F 9/4445* (2013.01)

(58) Field of Classification Search
CPC .................. G06F 9/546; H04L 29/08072
USPC .......................................... 709/203; 719/313
See application file for complete search history.

(56) References Cited

U.S. PATENT DOCUMENTS

| 8,312,475 B2 * | 11/2012 | Sareen et al. | 719/317 |
| 2008/0005228 A1 * | 1/2008 | Subbian | 709/203 |

OTHER PUBLICATIONS

Constantinescu, L., et al., "Automatic Mobile Device Synchronization and Remote Control System for High-Performance Medical Applications," Conf. Proc. IEEE Eng. Med. Biol. Soc. 2799-802 (Aug. 23-26, 2007).
Hess, D.; Rohrig, C., "Remote controlling of technical systems using mobile devices," *Intelligent Data Acquisition and Advanced Computing Systems: Technology and Applications, 2009, IDAACS 2009. IEEE International Workshop on*, vol., No., pp. 625,628, Sep. 21-23, 2009.
Haeil Hyun; Jonghyun Park; Yunchan Cho; Jae Wook Jeon, "PC application remote control via mobile phone," *Control Automation and Systems (ICCAS), 2010 International Conference on*, vol., No., pp. 2290,2294, Oct. 27-30, 2010.
Dickey, N.; Banks, D.; Sukittanon, S., "Home automation using Cloud Network and mobile devices," Southeastcon, 2012 Proceedings of IEEE, vol., No., pp. 1,4, Mar. 15-18, 2012.
Longmein Inc., LogMein. https://securelogmein.com, Jun. 19, 2013.
Phase Five Systems LLC., Jump Desktop. http://jumpdesktop.com., Jun. 19, 2013.
Splashtop Inc., Splashtop. http://www.splashtop.com, Jun. 19, 2013.
Wyse Technology Inc., Wyse PocketCloud, http://www.wyse.com/products/software/mobility/PocketCloud, Jun. 19, 2013.
Teamviewer GMbH, TeamViewer, http://www.teamviewer.com, Jun. 19, 2013.

* cited by examiner

*Primary Examiner* — Andy Ho
(74) *Attorney, Agent, or Firm* — Mintz Levin Cohn Ferris Glovsky and Popeo, P.C.

(57) ABSTRACT

A method for providing multi-touch, multi-user interactive control system using mobile devices. The method includes establishing socket connections with the mobile devices and receiving messages representing multi-touch user actions from the mobile devices through the socket connections. The messages are translated into predetermined parameters, and transmitted to an application for performing actions corresponding to the multi-touch user actions. Related apparatus, systems, techniques and articles are also described.

20 Claims, 7 Drawing Sheets

```
1  <script type="text/javascript" src="jquery-1.8.3.js"></script>
2  <script type="text/javascript" src="SocketPlus.js"></script>
3
4  <script type="text/javascript">
5      $(document).ready(function(){
6          this.oSocket = new SocketPlus("xxx.xxx.xxx.xxx", "xxxx");
7
8          var oLayer1 = document.getElementById("layer1");
9          oLayer1.addEventListener("panEvent", function(oEvent){
10             console.log("Pan event captured");
11         });
12         oLayer1.addEventListener("tapEvent", function(oEvent){
13             console.log("Tap event captured");
14         });
15     });
16 </script>
```

FIG. 5

```
1  <script type="text/javascript">
2  SocketPlus.prototype.createTapEvent =
       function(sMessage){
3    var oEvent = new CustomEvent(
4          this.tapEvent,
5          {
6              detail:{
7                  user:{
8                      name:sMessage.name,
9                      ip:sMessage.ip
10                 },
11                 socket:this,
12                 x:sMessage.x,
13                 y:sMessage.y,
14                 numberOfFinger:
                         sMessage.numberOfFinger
15             },
16             socket:this,
17             bubbles:true,
18             cancelable:true
19         }
20     );
21     return oEvent;
22 };
23 </script>
```

FIG. 6

MULTI-TOUCH MULTI-USER INTERACTIVE CONTROL SYSTEM USING MOBILE DEVICES

TECHNICAL FIELD

The subject matter described herein relates to an interactive control system, and particularly, to an interactive control system for mobile devices.

BACKGROUND

With the widespread adoption and availability of mobile technology such as mobile phones and hand-held tablets, an exponential increase in the number of mobile devices has been observed around the world. There is also a growing interest in using mobile devices to control electrical systems in homes, for study, work, and other applications.

Existing studies and proposals commonly employ client/server architecture for using mobile devices as system controls, e.g., in medical applications, robotics, PC games, and home appliances, while different protocols of communications are selected such as TCP/IP sockets, Bluetooth, Dual Tone Multi Frequency, and X10 transmission. However, these approaches require the control system to be specially designed for a particular application and may require additional hardware. It is also not easy to extend these approaches to other scenarios/applications.

Several existing products, such as LogMeIn, Jump Desktop, Splashtop, RocketCloud, and TeamViewer, adopt similar idea of remotely controlling computers via mobile devices. Each of these products requires the user to install a server program on a computer (e.g. Mac or Windows PC), and a client program on a mobile device (e.g. running iOS or Android operating system). In turn, these products allow the user to remotely control the computer, and access the files, pictures, applications and programs on the computer through the mobile device. Full mouse and keyboard control of a remote desktop is provided, including multi-touch control if the remote desktop is compatible.

One of the major limitations of existing products is the lack of flexibility in customization. Furthermore, existing products typically provide the user with full control of the remote desktop. While providing full-access of the remote desktop may be appropriate for personal use, in many business scenarios, such unrestricted access can be unsuitable and/or undesirable. Another major limitation of existing products is that only a single user is allowed.

SUMMARY

In some implementations, the resent subject matter provides a computer-implemented method for providing interactive control of an application comprising: establishing a first socket connection with a first mobile device; receiving a first message from the first mobile device through the first socket connection, the first message representing a first user-action performed by a first user using the first mobile device, and the first user-action comprising a first gesture using at least two fingers on a first touchscreen of the first mobile device; translating the first message into a first translated message including one or more predetermined parameters; and transmitting the first translated message to an application for performing a first action corresponding to the first user-action based on the first translated message.

In some variations, the first message is generated by capturing the first user-action and interpreting the captured action.

In some variations of the present subject matter, the method can also include generating a notification for the first translated message.

In some variations, the first translated message is transmitted to a plugin of the application.

In some variations of the present subject matter, the method includes establishing an application socket connection with the application, the first translated message being transmitted through the application socket connection.

In some variations, the method further includes establishing a second socket connection with a second mobile device; receiving a second message from the second mobile device through the second socket connection, the second message representing a second user-action performed by a second user using the second mobile device, and the second user-action comprising a second gesture using at least two fingers on a second touchscreen of the second mobile device; translating the second message into a second translated message including the one or more predetermined parameters; and transmitting the second translated message to the application for performing a second action corresponding to the second user-action based on the second translated message.

In some variations, the method further includes transmitting display data to the first and second mobile devices, the display data representing the first and second actions performed on the application.

In some implementations, the method can be implemented on a non-transitory computer medium storing instructions, which when executed by one or more processors, perform the method.

In some implementations, the present subject matter provides a system for providing interactive control of an application including a first mobile device comprising a first touchscreen, the first mobile device being configured for receiving one or more user-action performed by a first user, and transmitting a first message representing the first user-action the first user-action comprising, a first gesture using at least two fingers on the first touchscreen. The system also includes a server bridge configured for: establishing a first socket connection with the first mobile device, receiving the first message from the first mobile device through the first socket connection, translating the first message into a first translated message including one or more predetermined parameters, and transmitting the first translated message to an application for performing a first action corresponding to the first user-action based on the first translated message.

In some variations, the system the first mobile device is further configured to generate the first message by capturing the first user-action and interpreting the captured action.

In some variations of the present subject matter, the server bridge is further configured for generating a notification for the first translated message.

In some variations, the server bridge is further configured for transmitting the first translated message to a plugin of the application.

In some variations of the present subject matter, the server bridge is further configured for establishing an application socket connection with the application, the first translated message being transmitted through the application socket connection.

In some variations of the present subject matter, the server bridge is further configured for: establishing a second socket connection with a second mobile device; receiving a second message from the second mobile device through the second socket connection, the second message representing a second user-action performed by a second user using the second mobile device, and the second user-action comprising a second gesture using at least two fingers on a second touchscreen of the second mobile device; translating the second message into a second translated message including the one or more predetermined parameters; and transmitting the second translated message to the application for performing a second action corresponding to the second user-action based on the second translated message.

In some variations, the server bridge is further configured for transmitting display data to the first and second mobile devices, the display data representing the first and second actions performed on the application.

Computer program products are also described that comprise non-transitory computer readable media storing instructions, which when executed one or more data processors of one or more computing systems, causes at least one data processor to perform operations herein. Similarly, computer systems are also described that may include one or more data processors and a memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The subject matter described herein provides many advantages. For example, by providing a control system for mobile devices, it could facilitate interactions between multiple users and/or systems. The system can be configured to interact with one or more mobile devices to receiving information and feedback from, e.g., a remote desktop or an application to be displayed on the mobile device. This feature can be particularly useful if multiple users are connected to the same system as it further enables interaction among users. For instance, multiple users may collaboratively work on a system using individual controls provided on their mobile devices, and at the same time interact with each other using their mobile devices. The system may also be configured to enable multi-touch finger gesture support on mobile devices to provide an intuitive and efficient form of input. This is advantageous for, e.g., impaired individuals, especially those who find using a mouse or keyboard difficult. Besides natural finger operations like pointing and pressing, more sophisticated finger gestures can also be applied using multi-touch screens on the mobile devices. These gestures can include movements of up to five fingers to enable a versatile set of functionalities on mobile devices.

Furthermore, an implementation of the present subject matter can enable mobile devices to be used to control, e.g., slides shown by a computer during a presentation. In this example, users do not need to be tied to the computer; they have the freedom to move around the stage. Many other uses and advantages of the present subject matter are also provided, such as implementations involving very big screens to provide invaluable mobility to the users.

Unlike existing approaches, the present subject matter can provide one or more of: flexibility to adapt to/customize for different applications; allowing multiple users to interact with the application as well as each other; and support for multi-touch and/or user-defined gestures.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 5 is an example of computer instructions for implementing certain features of the present subject matter;

FIG. 6 is another example of computer instructions for implementing certain features of the present subject matter.

Like reference symbols in the various drawings indicate like elements.

DETAILED DESCRIPTION

Figure 1:
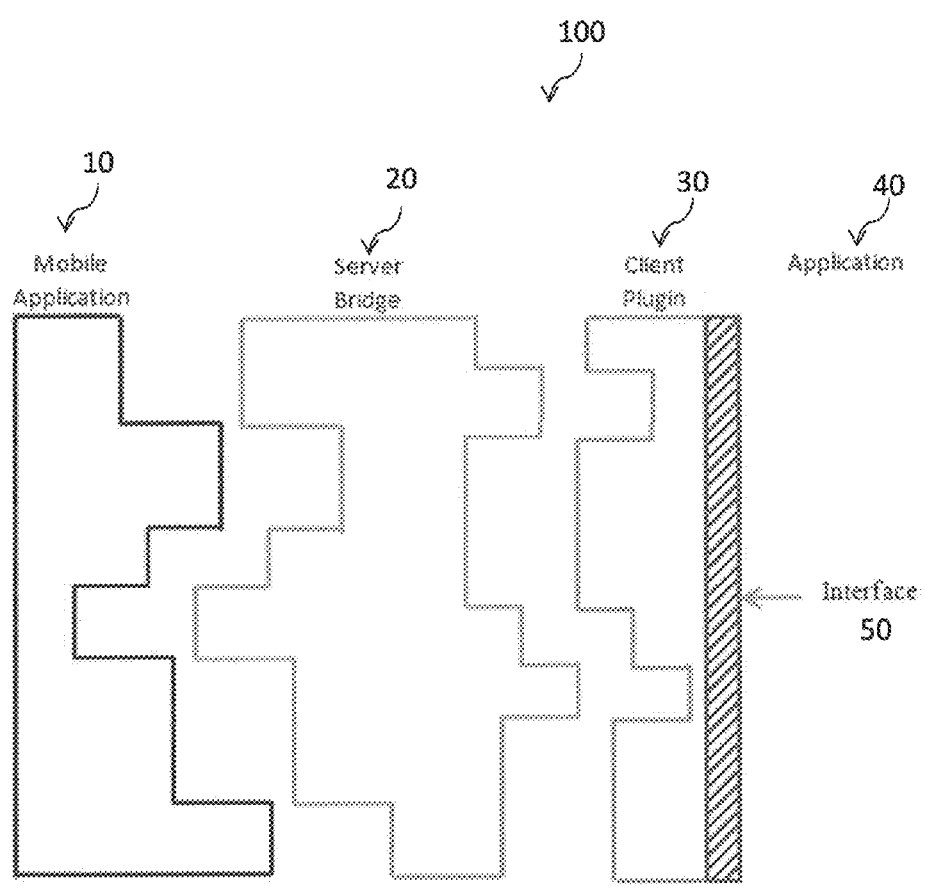
FIG. 1 is a diagram illustrating a modular architecture of a system in accordance with the present subject matter.

FIG. 1 is a diagram illustrating a modular architecture of a system 100 in accordance with the present subject matter. System 100 includes a plurality of components including: mobile application 10, server bridge 20, client plugin 30, application 40, and interface 50. As shown, server bridge 20 is configured to act as a bridge between mobile application 10 and client plugin 30, and communicates with both, client plugin 30 is associated and interacts with application 40 through interface 50. In some variations, client plugin 30 can be a thin, light-weight plugin. For example, the plugin can be configured to provide one or more characteristics including, e.g., small size (bytes), easy integration, causing no side effects in existing functionality, and does not result in significant overhead in the process of the application. Each of the components can be implemented via software (e.g. computer instructions executable by one or more processors), hardware, or any combination thereof.

In some variations, mobile application 10 can be a component or module provided on a mobile device such as a smartphone, tablet, or a handheld computing device and the like. Server bridge can be a component or module provided on, e.g., one or more servers, computers, or computer clusters in communication with mobile application 10 and application 40 (e.g. via client plugin 30). Client plugin 30 and/or application 40 can be implemented as one or more components provided on, e.g., one or more computers, servers, or computer clusters.

Figure 2:
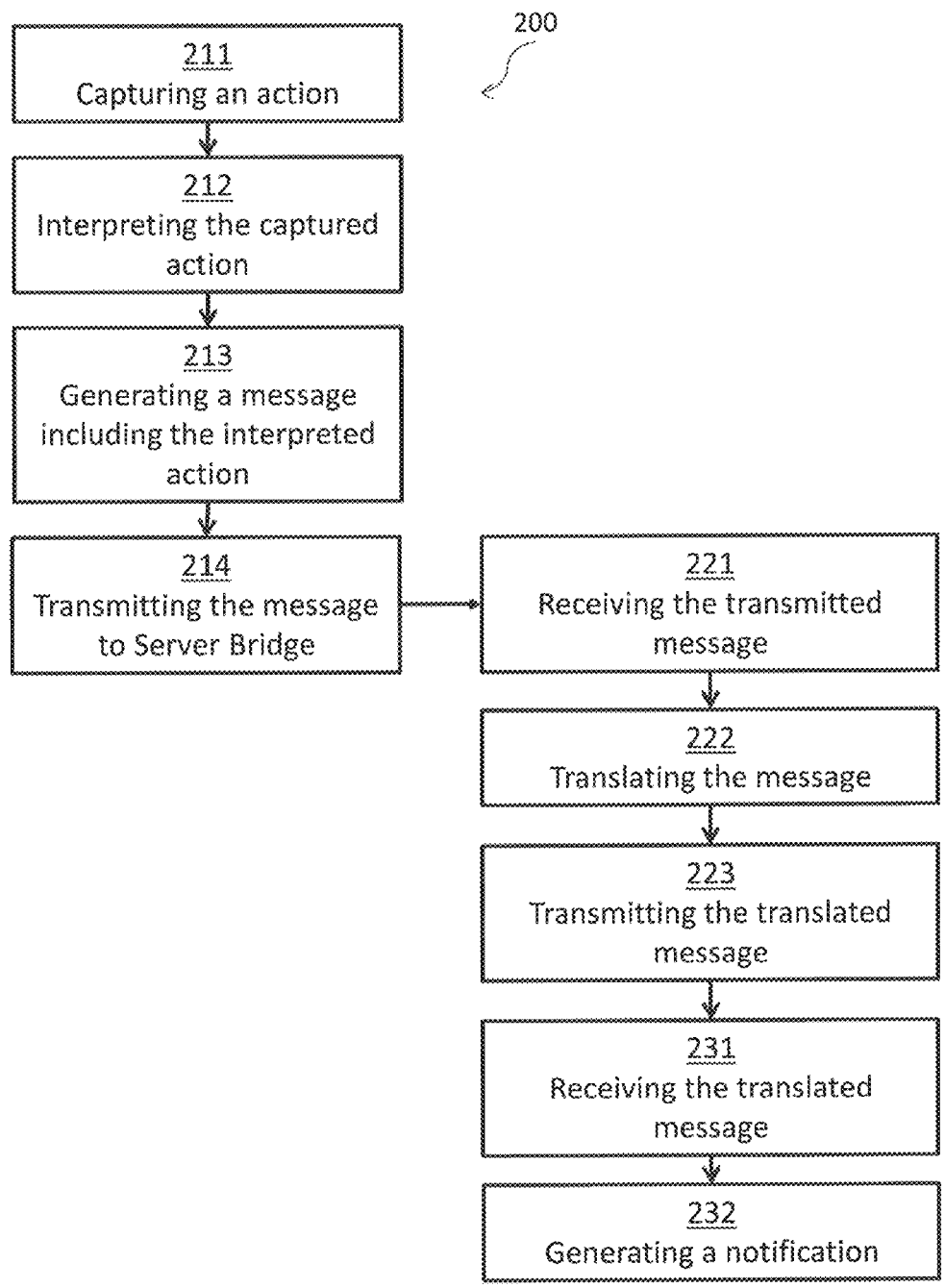
FIG. 2 is a process flow diagram illustrating a method of operation in accordance with the present subject matter.

Further references will now be made to FIG. 2, which shows the process flow of a method in accordance with the present subject matter. Mobile application 10 is configured for capturing an action (or actions) performed by the user on a mobile device (e.g. using a touchscreen of the mobile device) at 211. Mobile application 10 is also configured for interpreting the captured action at 212, generating a message including the interpreted action at 213, and transmitting the interpreted actions to server bridge 20 at 214.

Server bridge 20 is configured for receiving the transmitted message from mobile applications 20 at 221, translating the message at 222, and transmitting the translated message to client plugin 30 at 223. Client plugin 30 is configured for receiving the translated message at 231, and generating a notification at 232. Although only a single mobile application 10 and a single application 40 are discussed above, it should be noted that the server bridge can be configured to communicate among a plurality of mobile applications and/or applications, e.g., to allow multiple users to access one or more applications.

In some variations, one or more (i.e. including all) of the components are independent and/or communicate with each other via internet sockets to provide high-speed communication and/or handle high traffic volumes. This ensures that the communications are timely and without errors/loss. Internet sockets can also provide acknowledgements of the transmissions.

In some variations, both mobile application 10 and client plugin 30 can send and receive messages (and/or other data) through server bridge 20. This provides scalability in situations with a large number of users and/or applications. For example, application 40 can be configured to provide meeting/presentation features, to allow a plurality of users to interact with one another (e.g., to participate in a planning session), and actively participate in the meeting/presentation. In some variations, an extension can be provided to provide, e.g., the screen and functions from an application to be sent back to the mobile device(s). For example, map(s), presentation materials, applications and the like can be shared and accessed by one or more users through mobile devices. In some variations, each user can, for example, draw (or perform an action) and send it back to the application. Once accepted, the new information can be updated on the map (or the relevant information can be updated) and shared with other users. Allowing both mobile application 10 and client plugin 30 to send and receive messages (and/or other data) through server bridge 20 also avoids any technical and/or performance limitations if either the mobile application 10 or client plugin 30 has to decipher and moderate all messages transmitted.

In some variations, server bridge 20 translates the received messages and transmits the translated messages in a First-In-First-Out (FIFO) manner. In some variations, each message can also include time-stamp data. Server bridge can also be provided with conflict-handling capabilities if multiple messages are received at or about the same time. For example, one or more of the mobile applications can receive priority handling over others.

Figure 3:
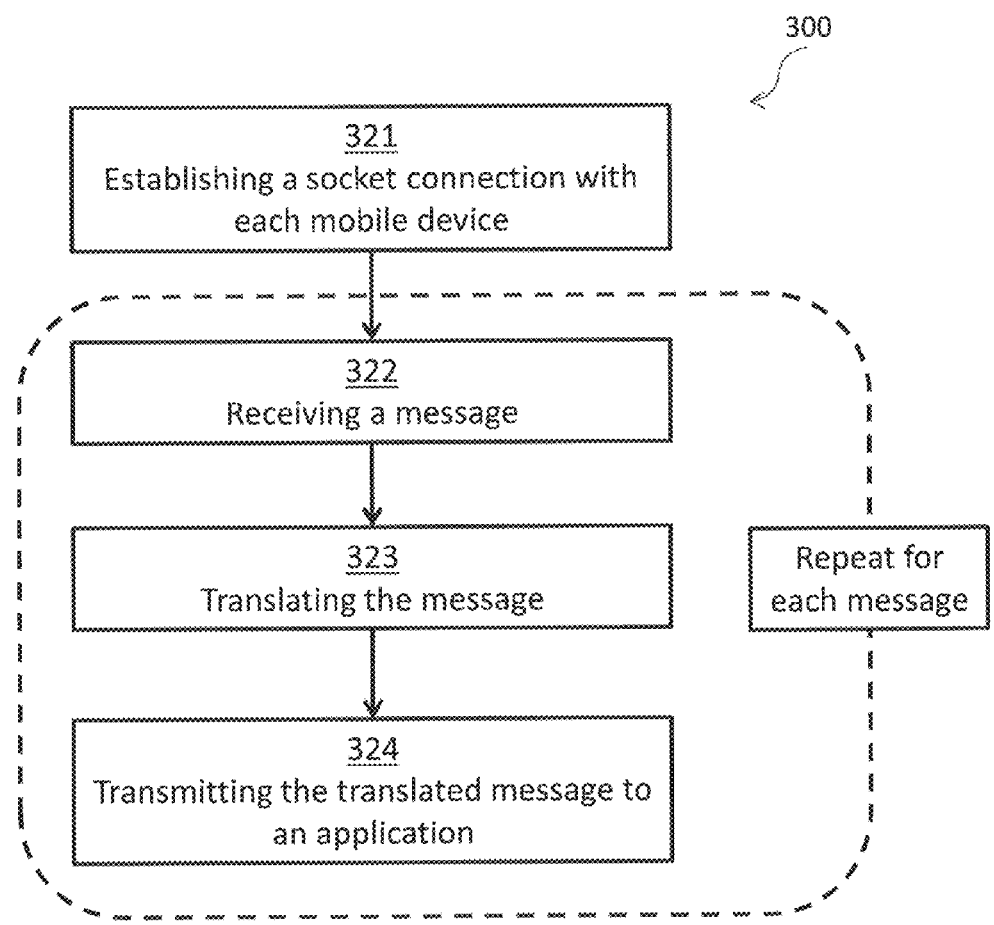
FIG. 3 is a process flow diagram illustrating another method of operation in accordance with the present subject matter.

FIG. 3 is a process flow diagram of a method 300 implementing a server bridge 20 in accordance with the present subject matter. At 321, a socket connection is established with a mobile device. 321 is repeated for each additional mobile device(S). For each message transmitted by the mobile device (e.g., representing a user-action such as a multi-touch gesture performed by a user using the mobile device), method 300 receives the message at 322, translates the message into a translated message including one or more predetermined parameters at 323, and transmits the translated message to an application for performing an application action corresponding to the user-action based on the translated message at 324. 322-324 are repeated for each message from each of the connected mobile devices.

Figure 7:
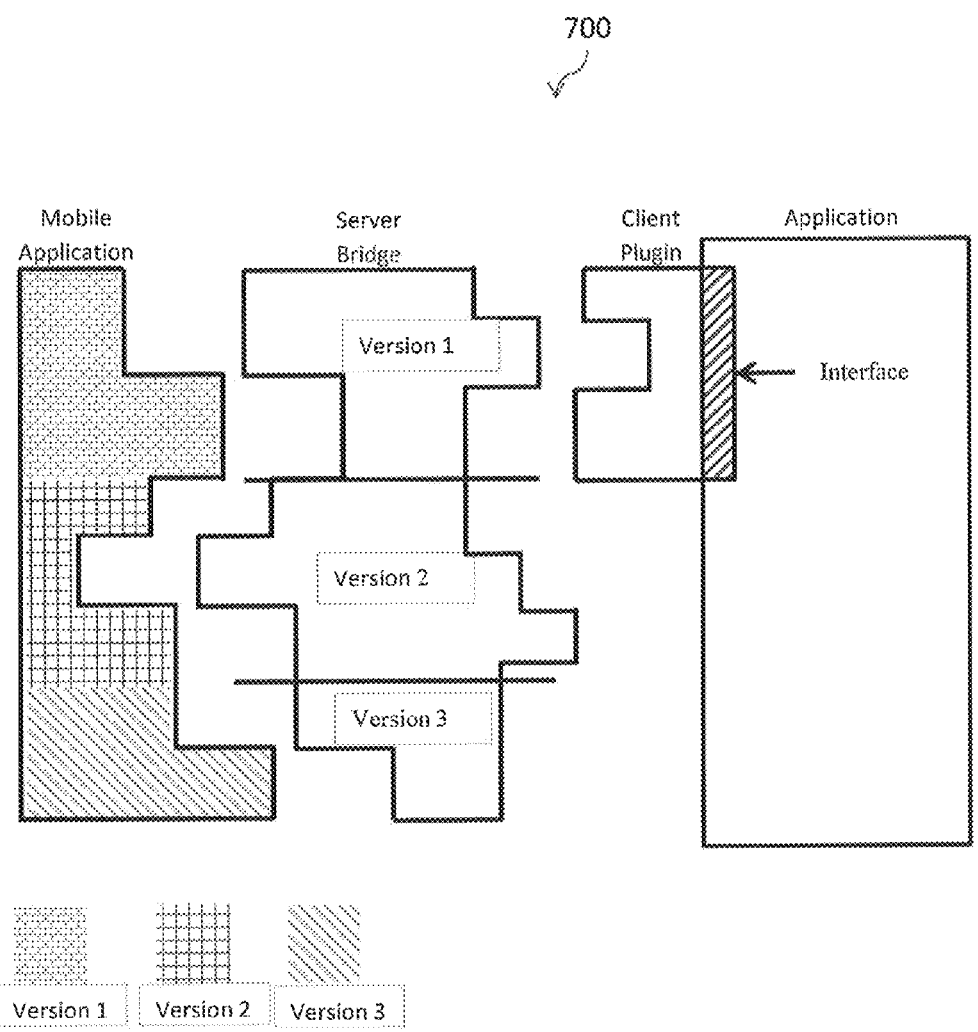
FIG. 7 is a diagram illustrating a variation of the present subject matter.

By decoupling mobile application 10 and client plugin 30, the present subject matter allow thin, lightweight components (e.g. the decoupling utilizes the server bridge to handle various tasks, thereby allowing both the client plugin and/or mobile application to be simple and small implementations), ease of extension to support new devices, and legacy support via server bridge 20. An example of this is illustrated in FIG. 7, which shows a variation of the implementation of FIG. 1. System 700 is similar to system 100, and is configured to support an extension and new mobile applications (e.g. versions 1 to 3) developed. In some variations, these can be transparent to the client plugin and each individual version. In some variations, only the server bridge is extended to handle the variations (and/or additional variations). It should be noted that the versions are shown for illustrative purposes only, and other variations in the number of extensions and mobile applications are within the present subject matter.

By providing server bridge 20, which communicates and translates between the mobile application 10 and client plugin 30, much of the computing power required for these tasks can be provided by a separate computing device (such as a computer, server, cluster, etc.) that, e.g., can have a greater computing power than the devices implementing mobile application. 10 and/or client plugin 30/application 40. The additional layer provided by server bridge 20 also allows it to be configured to translate between, e.g. legacy devices/mobile applications, as well as new devices/mobile applications to/from legacy applications as well as new applications. In other words, only the server bridge 20 needs to be configured/updated to translate between one or more mobile applications and client plugins/applications, when new or updated mobile applications, client plugins, and/or applications are introduced.

In some variations, server bridge 20 creates a standardized translation for each received message. For example, each received message can be translated into smaller packages to be transmitted. In some variations, different actions (e.g. different gesture/action) can share as many parameters as possible to allow the messages to be compact.

In some variations, Interface 50 between client plug in 30 and application 40 can be designed to be thin and hassle-free for the application developers. For example, essential and common actions such as pan and tap default handling can be pre-implemented or predefined. In some variations, interface 50 can be configured to allow application developers to customize and/or map gestures to their specific elements or behaviors in their applications. For example, a first captured action in a first application can be configured to execute a first action by the first application, while the same captured action in a second application can be configured to execute a second action (different from the first action) by the second application.

In some variations, the process at which connectivity is established begins with a socket connection from mobile application 10 to server bridge 20. Once connection is established, details about the user can be sent over from mobile application 10 to server bridge 20. Server bridge 20 can then format and/or forward the details over to client plugin 30 and application 40. In some variations, server bridge 20 can be configured to automatically detect if a previously connected mobile application has closed its connection to the server bridge. This information can be interpreted as a logout and any connected client plugin can be updated.

In some variations, client plugin 30 can be configured such that after the host application has loaded, it will initiate a socket connection over to server bridge 20. Upon a successful connection, client plugin 30 can register itself with server bridge 20, which then sends a list of user details currently connected to the client plugin. When the host application closes the corresponding socket connection between client plugin 30 and server bridge 20, server bridge 20 can disconnect from the mobile application 10 as well. Similarly, the severance of connection between mobile application 10 and server bridge 20 can be automatically detected by server bridge 20. The difference is that this information can optionally not be sent back to the connected mobile application, and/or allow automatic reconnection from mobile application 10 back to client plugin 30 once it has been restarted.

Figure 4:
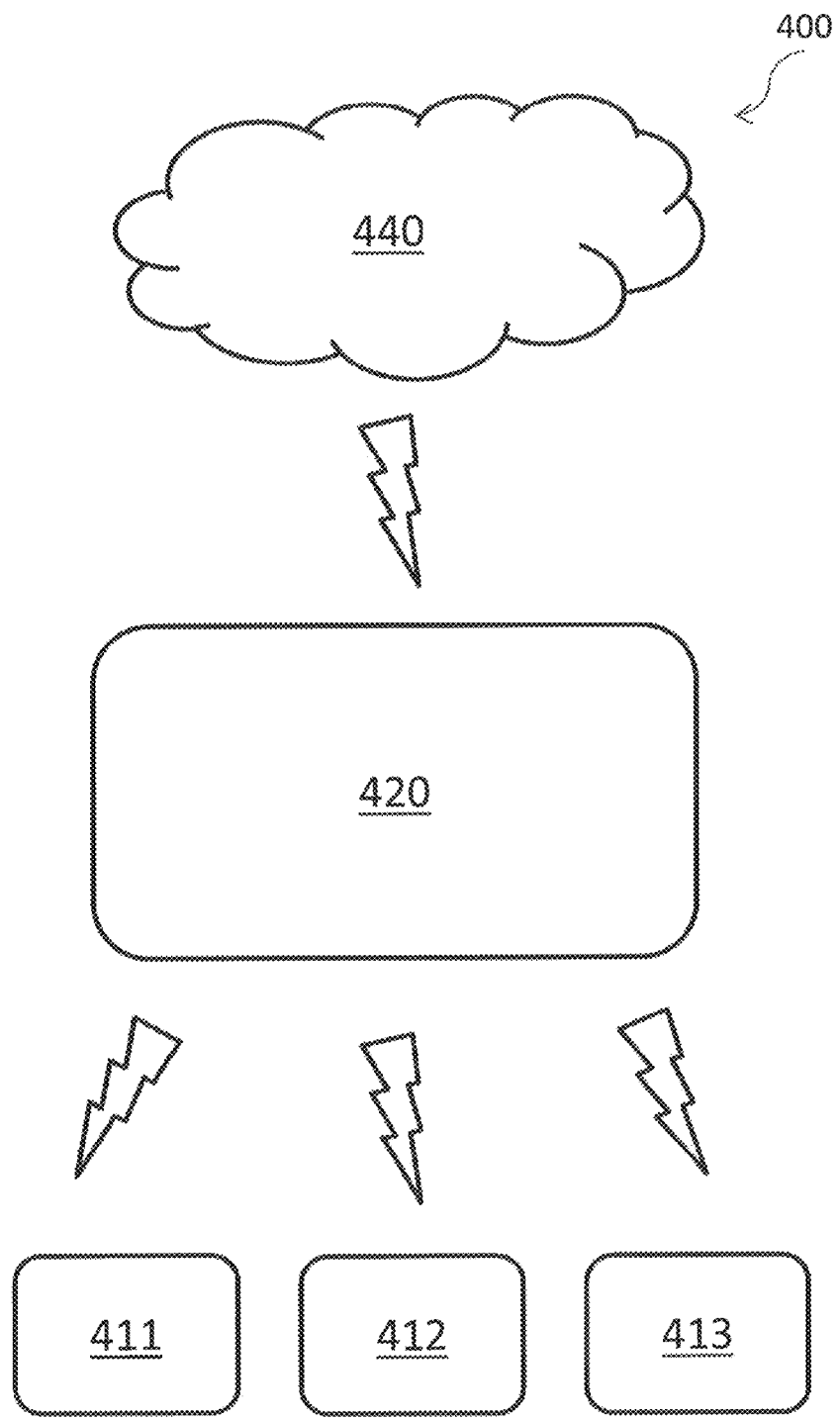
FIG. 4 is a diagram illustrating an example of an implementation in accordance with the present subject matter.

FIG. 4 shows system 400 implementing the present subject matter. As shown, one or more mobile devices 411, 412, and 413 are provided. Each of the mobile devices include a mobile application 10 (e.g. an application for an operating system such as iOS, Android, Windows Mobile, and the like), and are configured to communicate with server bridge 420. The connection(s) between the mobile devices and the server bridge can be established using, e.g. web sockets for HTML 5, and server bridge 420 may include Java socket implementation. Web application 440 is provided with application 40, client plugin 30 and interface 50 between application 40 and client plugin 30. The client plugin can be Javascript class with websocket capabilities.

In this implementation, web application 440 (e.g. part of a website, or an application accessible over the web) is configured to allow users of mobile devices 411, 412, and 413 (and any other connected devices) to interact with one another using multi-touch gestures. For example, web application 440 can be configured to allow the users to share a visual display having one or more items/information that can be generated and/or manipulated by one or more of the users using multi-touch gestures on the mobile devices. The multi-touch gestures can include, e.g., movements of one or more fingers on a touchscreen representative of an input/action desired by the user. The present subject matter can be configured to track an unrestricted number of gestures performed by any number of fingers (the number of fingers that can be tracked is typically limited by the device, and not by the present subject matter). For example, a device having a relatively large screen can be configured to allow the user use all the fingers in both hands (or even multiple hands from multiple users). In some variations, one or more of the users are provided with unrestricted access to web application 440 (e.g., information, files, contents, administrative capabilities, etc.) while other user(s) have one or more restrictions.

In some variations, instead of a web application, the application can be implemented in a remote computer (or a server, computer cluster, etc.) to provide one or more users access thereto using mobile devices. For example, the application can provide a remote desktop to allow the user(s) access to, e.g., information, files, contents, and/or data using multi-touch gestures. In some variations, one or more gestures can be customized to provide user-defined actions and/or access to the remote computer.

The present subject matter can be deployed/implemented through relatively simple steps. For example, a use (e.g. an end user) can install mobile application 10 on the mobile device, and be provided with the IP address of server bridge 320, dependent on the setup requirements of the deployment/implementation.

In some variations, server bridge 320 can be configured to run as a daemon service, and to listen to incoming messages from both the mobile application and the client plugin at designated ports. These can be run as a shared or dedicated service depending on the requirements.

In some variations, the client plugin can be configured to enable multi-touch on, e.g., a web application through as few as just two lines of code. The first of which is to load it into the web application, and the second is to initialize it with the IP address of the server bridge. FIG. 5 is an example of how the present subject matter can be embedded within an application. For example, Line 2 can be used to include the source file for the present subject matter. Once the entire entire document has been loaded, an instance of the present subject matter can be created (Line 6). The parameters required can include, e.g., one or more of the IP address and the port of the server bridge.

In some variations, customization of the multi-touch gestures can be available as they are handled as, e.g., standard Javascript events. For example, upon receiving a gesture from the server bridge, the client plugin can create a customized Javascript event that is then dispatched to the corresponding HTML element. In some variations, it can be configured by the web application to add the necessary event handlers and execute the intended functions/code.

Again referring to FIG. 5, it can be seen how the multi-touch events from the mobile application can be captured within the application and customized. The target element can be retrieved (Line 8), and the relevant event listeners can be added to it (Lines 9-14). In some variations, only logging on the debug console on the type of event captured is needed.

In some variations, information that details the event can also be obtained in the attribute of the oEvent variable. FIG. 6 is an example of a list of the details associated with a "Tap" (a gesture captured of a multi-touch mobile device) event. The coordinates at which the user tapped on the mobile application can be recorded, as well as the number of fingers used. Through this information, application(s) 40 can be easily customized the desired behavior and actions by calling the relevant functions and logic. In other words, the gestures/actions can be readily customized to adapt to the needs of the application.

As can be appreciated by one skilled in the art, the penetration of multi-touch devices have created a new generation of users comfortable with the gestures associated with such devices. Developers can embrace such trends by capturing and handling them in their application. The present subject matter enables inputs prom multi-touch devices to be captured and customized by the application(s). It goes beyond the capturing of the gestures to allow multiple users to be able to interact within the same application. The present subject matter also allows easy integration with existing applications (e.g. web applications).

Using the present subject matter, developers of existing applications can easily enable and customize the multi-touch gestures users perform on a device. Multiple users are also able to easily connect to a single application.

The present subject matter can be implemented to allow users to download and interact with information from the application. The users can also be allowed to modify and share new information with other connected users or back to the application.

Aspects of the subject matter described herein can be embodied in systems, apparatus, methods, and or articles depending on the desired configuration. In particular, various implementations of the subject matter described herein can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. A client and server are generally, but not exclusively, remote from each other and typically interact through a communication network, although the components of the system can be interconnected by any form or medium of digital data communication. Examples of communication networks include, but are not limited to, a local area network ("LAN"), a wide area network ("WAN"), and the Internet. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail herein, other modifications or additions are possible. In particular, further features and/or variations can be provided in addition to those set forth herein. For example, the implementations described above can be directed to various combinations and sub-combinations of the disclosed features and/or combinations and sub-combinations of one or more features further to those disclosed herein. In addition, the logic flows depicted in the accompanying figures and or described herein do not necessarily require the particular order shown, or sequential order, to achieve desirable results. The scope of the following claims may include other implementations or embodiments

What is claimed is:

1. A computer-implemented method for providing interactive control of an application comprising:
    establishing a first socket connection with a first mobile device;
    receiving a first message from the first mobile device through the first socket connection, the first message representing a first user-action performed by a first user using the first mobile device, and the first user-action comprising a first gesture using at least two fingers on a first touchscreen of the first mobile device;
    translating the first message into a first translated message including one or more predetermined parameters; and
    transmitting the first translated message to an application for performing a first action corresponding to the first user-action based on the first translated message.

2. A computer-implemented method according to claim 1, wherein the first message is generated by capturing the first user-action and interpreting the captured action.

3. A computer-implemented method according to claim 1, further comprising generating a notification for the first translated message.

4. A computer-implemented method according to claim 1, wherein the first translated message is transmitted to a plugin of the application.

5. A computer-implemented method according to claim 1, further comprising establishing an application socket connection with the application, the first translated message being transmitted through the application socket connection.

6. A computer-implemented method according to claim 1, farther comprising;
    establishing a second socket connection with a second mobile device;
    receiving a second message from the second mobile device through the second socket connection, the second message representing a second user-action performed by a second user using the second mobile device, and the second user-action comprising a second gesture using at least two fingers on a second touchscreen of the second mobile device;
    translating the second message into a second translated message including the one or more predetermined parameters; and
    transmitting the second translated message to the application for performing second action corresponding to the second user-action based on the second translated message.

7. A computer-implemented method according to claim 6, further comprising transmitting display data to the first and second mobile devices, the display data representing the first and second actions performed on the application.

8. A system for providing interactive control of an application comprising:
    a first mobile device comprising a first touchscreen, the first mobile device being configured for receiving one or more user-action performed by a first user, and transmitting a first message representing the first user-action, the first user-action comprising a first gesture using at least two fingers on the first touchscreen; and a server bridge configured for:
    establishing a first socket connection with the first mobile device,
    receiving the first message from the first mobile device through the first socket connection,
    translating the first message into a first translated message including one or more predetermined parameters, and
    transmitting the first translated message to an application for performing a first action corresponding to the first user-action based on the first translated message.

9. The system according to claim 8, wherein the first mobile device is further configured to generate the first message by capturing the first user-action and interpreting the captured action.

10. The system according to claim 8, wherein the server bridge is further configured for generating a notification for the first translated message.

11. The system according to claim 8, wherein the server bridge is further configured for transmitting the first translated message to a plugin of the application.

12. The system according to claim 8, wherein the server bridge is further configured for establishing an application socket connection with the application, the first translated message being transmitted through the application socket connection.

13. The system according to claim 8, wherein the server bridge is further configured for;
    establishing a second socket connection with a second mobile device;
    receiving a second message from the second mobile device through the second socket connection, the second message representing a second user-action performed by a second user using the second mobile device, and the second user-action comprising a second gesture using at least two fingers on a second touchscreen of the second mobile device;
    translating the second message into a second translated message including the one or more predetermined parameters; and
    transmitting the second translated message to the application for performing a second action corresponding to the second user-action based on the second translated message.

14. The system according to claim 13, wherein the server bridge is further configured for transmitting display data to the first and second mobile devices, the display data representing the first and second actions performed on the application.

15. A non-transitory computer readable medium comprising instructions, which when executed by one or more processors, perform the method for providing interactive control of an application comprising:
    establishing a first socket connection with a first mobile device;
    receiving a first message from the first mobile device through the first socket connection, the first message representing a first user-action performed by a first user using the first mobile device, and the first user-action comprising a first gesture using at least two fingers on a first touchscreen of the first mobile device;
    translating the first message into a first translated message including one or more predetermined parameters; and
    transmitting the first translated message to an application for performing a first action corresponding to the first user-action based on the first translated message.

16. The non-transitory computer readable medium according to claim 15, wherein the first message is generated by capturing the first user-action and interpreting the captured action.

17. The non-transitory computer readable medium according to claim 15, further comprising generating a notification for the first translated message.

18. The non-transitory computer readable medium according to claim 15, wherein the first translated message is transmitted to a plugin of the application.

19. The non-transitory computer readable medium according to claim 15, further comprising establishing an application socket connection with the application, the first translated message being transmitted through the application socket connection.

20. The non-transitory computer readable medium according to claim 15, further comprising:
    establishing a second socket connection with a second mobile device;
    receiving a second message from the second mobile device through the second socket connection, the second message representing a second user-action performed by a second user using the second mobile device, and the second user-action comprising a second gesture using at least two fingers on a second touchscreen of the second mobile device;
    translating the second message into a second translated message including the one or more predetermined parameters; and
    transmitting the second translated message to the application for performing a second action corresponding to the second user-action used on the second translated message.

* * * * *